United States Patent [19]

Eriksson

[11] 4,292,134
[45] Sep. 29, 1981

[54] BIOLOGICAL SHIELD FOR INSULATING PRESSURE VESSELS

[75] Inventor: Olle Eriksson, Vesteras, Sweden

[73] Assignee: Ab Asea Atom, Sweden

[21] Appl. No.: 16,634

[22] Filed: Mar. 1, 1979

[30] Foreign Application Priority Data

Mar. 6, 1978 [SE] Sweden ............................ 02489/78

[51] Int. Cl.³ ............................................. G21C 9/00
[52] U.S. Cl. ........................................................ 176/38
[58] Field of Search ............................. 176/37, 38, 87

[56] References Cited

U.S. PATENT DOCUMENTS

| | | | |
|---|---|---|---|
| 3,372,092 | 3/1968 | Margen | 176/87 |
| 3,489,206 | 1/1970 | Lecourt | 176/87 |
| 3,888,730 | 6/1975 | Jackson | 176/38 |
| 3,928,133 | 12/1975 | Schabert et al. | 176/87 |
| 3,985,614 | 10/1976 | Jungmann | 176/87 |
| 3,990,941 | 10/1976 | Scholz | 176/87 |
| 3,991,899 | 10/1976 | Vaessen | 176/38 |
| 4,032,393 | 6/1977 | Beine et al. | 176/38 |
| 4,036,700 | 7/1977 | Dorner et al. | 176/38 |
| 4,061,534 | 12/1977 | Jackson | 176/38 |
| 4,076,585 | 2/1978 | Cachera | 176/38 |

Primary Examiner—S. A. Cangialosi
Attorney, Agent, or Firm—Pollock, Vande Sande & Priddy

[57] ABSTRACT

A hollow, biological shield assembly capable of surrounding and insulating a nuclear reactor pressure vessel positioned therein. The shield assembly includes a metallic lining attached to a radially inner wall portion of a hollow concrete body, with a layer of thermally insulating material attached to the metallic lining and a plurality of vertical cooling channels also attached to the lining and mounted in recesses formed in the concrete body.

14 Claims, 6 Drawing Figures

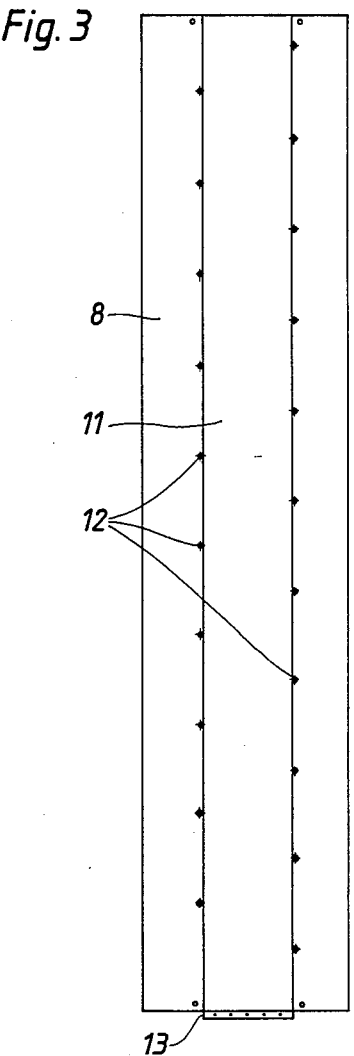
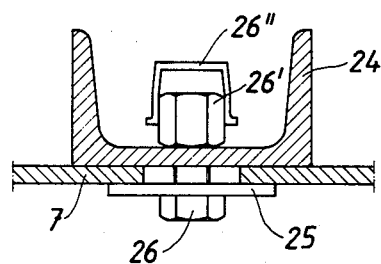
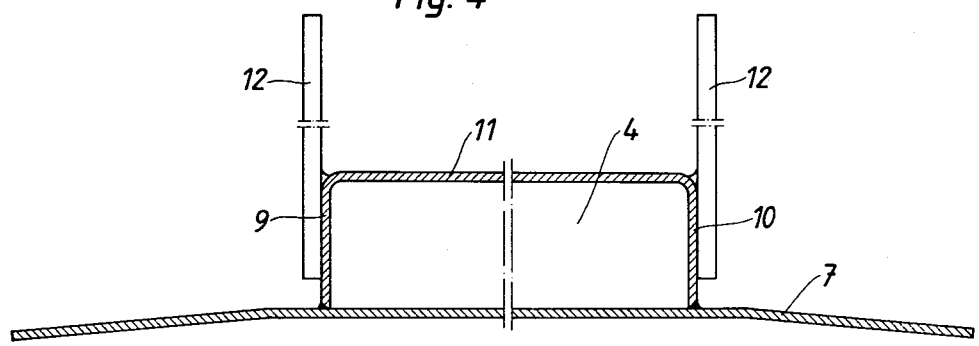

BIOLOGICAL SHIELD FOR INSULATING PRESSURE VESSELS

BACKGROUND OF THE INVENTION

The present invention generally relates to biological shield assemblies of the type surrounding nuclear reactor pressure vessels. In particular, the present invention is directed to a unique, thermally-insulated biological shield assembly which eliminates the need for attaching thermal insulation to the reactor vessel itself.

In order to safely protect the immediate environment about a nuclear reactor pressure vessel, it has become standard practice to position the pressure vessel within a biological shield assembly which usually takes the form of a hollow, concrete body. In addition, a layer of thermal insulation must be positioned between the pressure vessel and concrete body to absorb the relatively high level of heat transmitted outwardly from the pressure vessel during operation of the nuclear reactor.

One of the problems facing known biological shield assemblies is the inability to easily position the thermal insulation between the concrete body and the pressure vessel enclosed therein. Known assemblies suggest attaching the thermal insulation directly to the outer wall of the pressure vessel. This approach has proven generally less than completely satisfactory, in that such a structure severely reduces direct access to the pressure vessel as may be required for maintenance and the like. Because the insulation must be formed with a high degree of accuracy to properly fit the pressure vessel, the overall manufacturing and installation costs are relatively great.

Another approach employed by prior art assemblies is to attach the thermal insulation directly to the concrete body itself. This approach has also proven less than completely satisfactory, in that a relatively large amount of time is required to attach the thermal insulation directly to the concrete shield. Furthermore, such structures generally fail to provide efficient and adequate passageways for the removal of heat from the immediate vicinity of the concrete. As a result, the concentration of heat causes a build-up of thermal stress in the concrete, which reduces the ability of the concrete body to endure pressure shocks, as may occur when a reactor tube within the pressure vessel accidently ruptures.

As will be discussed in detail hereinafter, the present invention provides a thermally-insulated biological shield assembly capable of overcoming each of the aforestated problems, while at the same time effectively preventing the build-up of heat in the immediate vicinity of the concrete body through a combination of thermal insulation and flow passageways.

OBJECTS AND SUMMARY OF THE PRESENT INVENTION

An object of the present invention is to provide a thermally-insulated, biological shield wherein a metallic lining is fixedly attached to a radially inner wall surface of a hollow, cylindrically-shaped concrete body, with a layer of thermally insulating material attached to the metallic lining.

A further object of the present invention is to provide a biological shield assembly wherein vertically extending metallic channels are attached to the metallic lining and fixedly mounted within the concrete body to give a well-defined, even and efficient distribution of the cooling air generally passing vertically between the pressure vessel and the biological shield.

Another object of the present invention is to provide a biological shield assembly wherein the inner metallic lining provides an inner mould for casting the concrete body into a properly shaped structure.

Another object of the present invention is to provide a biological shield for a nuclear reactor pressure vessel which is relatively inexpensive to manufacture, as well as quick and easy to assemble.

Each of these, as well as additional objects is achieved in a preferred embodiment of the present invention, wherein a plurality of ring-shaped lining sections are mounted on top of one another and are attached to an inner, cylindrically-shaped wall of a hollow concrete body. Each of the ring-shaped sectons is, itself, formed from a plurality of separate slightly-curved lining segments releasably attached to one another. In addition, a plurality of vertically extending passageways are attached to the lining segments and are mounted in recesses formed in the radial inner wall of the concrete body. Thermally insulating material is positioned with a plurality of support boxes, which boxes are releasably attached to the radial inner surface of the lining segments. A plurality of spaced bars extend from the passageways into the concrete body to fixedly join the metallic lining and attached passgeways with the concrete body during the casting procedure.

The present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein:

FIG. 3 shows a segment of the lining formed in accordance with the present invention;

FIG. 4 shows a cross-sectional view of the lining segment of FIG. 3;

FIG. 5 shows a horizontal view of a joint assembly employed for joining adjacent lining segments of the type shown in FIG. 3.

DETAILED DESCRIPTION OF THE PREFERRED EMBODIMENT

Figure 1:
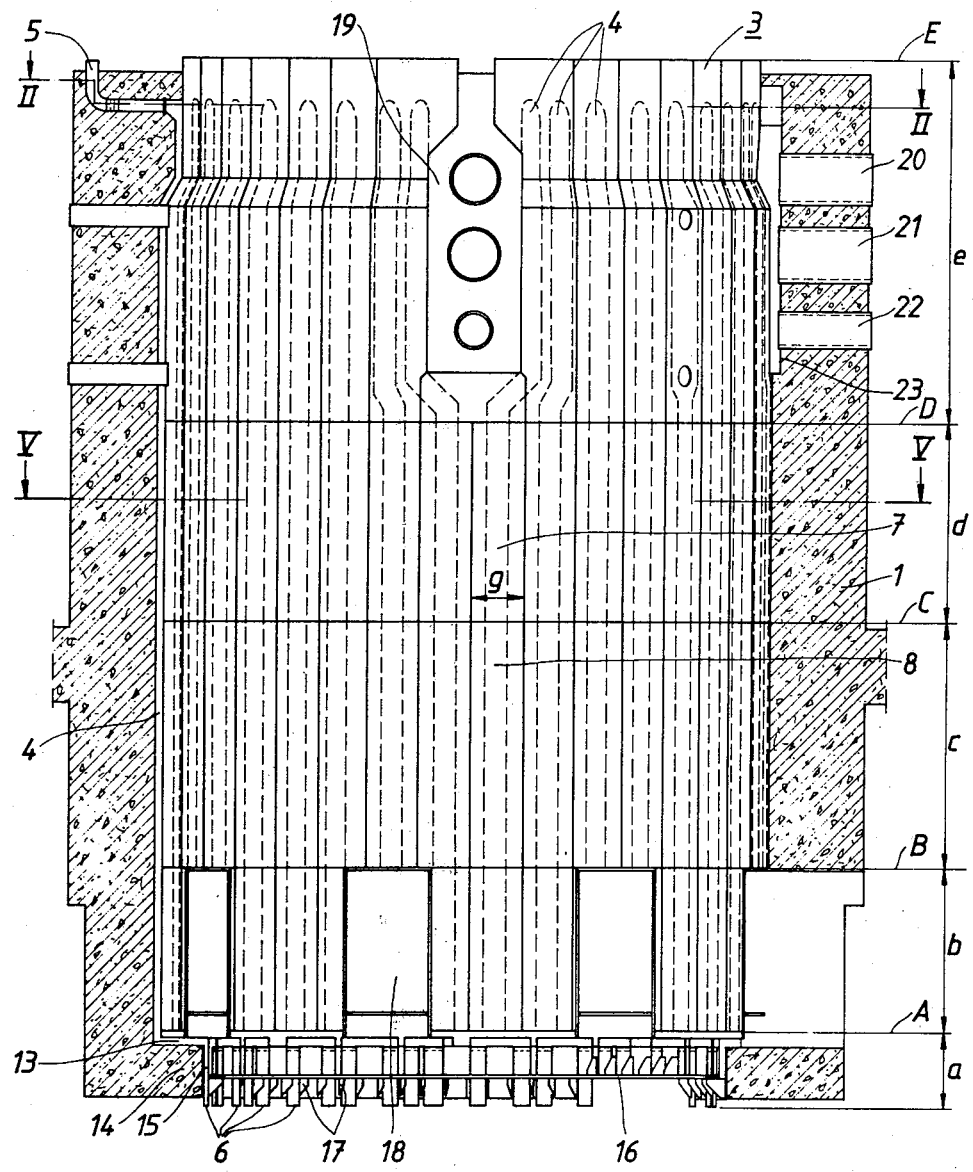
FIG. 1 shows a schematic representation of a biological shield assembly formed in accordance with the present invention, wherein thermally insulating material has not yet been attached, with the view taken along an axial section I—I of FIG. 2.
Figure 2:
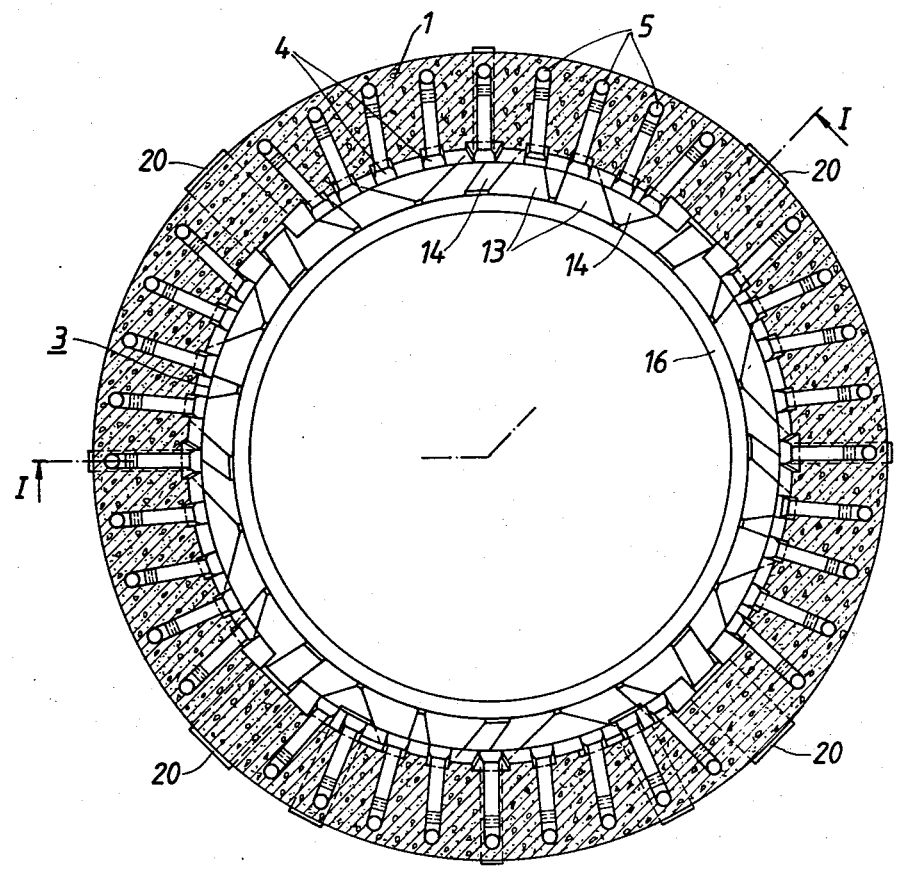
FIG. 2 shows a schematic representation taken along the horizontal section II—II of FIG. 1.

Referring to the drawings, and to FIGS. 1 and 2 in particular, a biological shield assembly formed in accordance with the present invention is shown prior to attachment of any thermal insulation.

Figure 6:
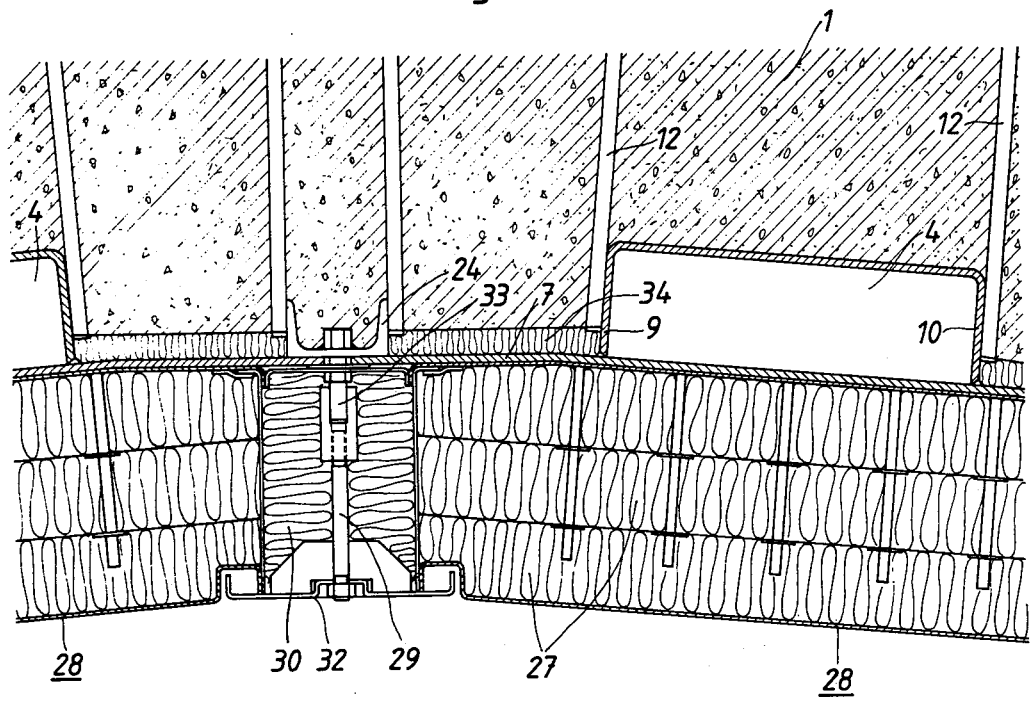
FIG. 6 shows a partial view of a thermally insulated, biological shield taken along the section V—V of FIG. 1.

A hollow body, formed of concrete and substantially cylindrical in cross-section is generally indicated at 1. Concrete body 1 extends in a substantially vertical direction and rests on a conventional base assembly (not shown for purposes of clarity). A nuclear reactor pressure vessel 2 is positioned within concrete body 1 and is spaced from a radial inner wall thereof as best shown in FIG. 6.

A lining of a material, such as sheet steel, is indicated at 3 and is attached to the radial inner wall surface of concrete body 1 in a manner to be explained in detail hereafter. Lining 3 is attached to a plurality of circumferentially spaced and vertically extending metallic cooling channels 4, with each channel positioned within a recess formed in the radial inner wall portion of concrete body 1. Each cooling channel 4 also includes at least one inlet 5 and one outlet 6 attached to opposite end portions thereof, to effect the flow of cooling air therethrough. As will be explained hereinafter, a portion of the heat emitted from pressure vessel 2 is carried away from concrete body 1 via cooling channels 4. Because the metallic cooling channels 4 are attached to metallic liner 3, heat propogation in the tangential direction is facilitated, thereby avoiding the formation of relatively large temperature gradients in the tangential direction of lining 3 and channels 4, respectively.

Referring again to FIG. 1, it is noted that lining 3 is formed of five ring-shaped sections mounted one on top of the other. Each ring-shaped section includes a vertical dimension indicated by one of the letters a, b, c, d, or e, respectively; wherein the vertically upper edge of each ring section extends substantially within a horizontal plane designated by one of the letters A, B, C, D, or E, respectively. Each of these planes A-E may also correspond to a sequential stage employed during the casting of concrete body 1. For the purposes of explanation only, five stages have been shown in FIG. 1; however, it would be within the scope of the present invention to employ any number of ring-shaped sections and separate casting levels, dependent on the particular vertical height of the finished concrete body. During formation of concrete body 1, each ring-shaped section a-3 serves as a mould for casting of a corresponding section of the concrete body, thereby ensuring that hollow concrete body 1 is properly sized.

Each ring-shaped section of metallic lining 3 is formed from a plurality of separate, similarly-shaped segments, as examplified by segments 7 and 8, best shown in FIGS. 1, 3 and 4, respectively. Each lining segment is formed with a substantially uniform width, indicated by the letter g. Furthermore, each lining segment is slightly curved to form each ring-shaped section when the segments are attached to one another. Each lining segment includes a pair of spaced, channel wall portions 9 and 10 which extend substantially perpendicular to the lining segment, and which may be attached by welding or the like. Each pair of channel wall portions 9 and 10 are substantially similar in shape, with an additional channel wall portion 11 extending between end portions of channels 9 and 10 to define an enclosed segment of cooling channel 4. Each segment of cooling channel 4 is vertically aligned with a further channel segment attached to a vertically adjacent ring-shaped section to form a plurality of continuous channels 4 extending substantially the entire vertical height of metallic lining 3. A plurality of parallel attachment bars 12 are each welded to channel portions 9 and 10, with attachment bars 12 extending into and fixedly attached within concrete body 1 during the casting procedure. Each lining segment also includes an attachment plate 13 which is welded to a vertical end portion thereof, with a plurality of holes formed in each attachment plate 13 for attaching the lining segment with a separate, vertically aligned segment.

At this point it should be pointed out that one of the particular benefits of the present invention is the ability to effectively protect the inner walls of each metallic channel 4 from the corrosive influence of any condensate which forms within channel 4 during operation. It is not suitable to employ galvanized sheet for the channel wall portions, in that the zinc covering of the sheets would be quickly destroyed in the vicinity of the welding seams through prolonged contact with the condensate. Furthermore, spraying or coating the inner channel walls with an anti-corrosive agent would be both difficult and relatively expensive. The present invention effectively overcomes the aforestate corrosion problem by forming each of the lining segments with relatively small dimensions, allowing them to be hot-galvanized by immersion into a conventionally-sized zinc bath. The small size of the segments 7 and 8 is evidenced by the fact that, in the preferred embodiment, each lining segment extends less than one-tenth of the overall circumference of its respective ring-shaped section.

Channel wall portions 9, 10 and 11 belonging to the particular lining segments extending between horizontal planes A and B are connected at their lower end portions to a plurality of flat, collection and distribution boxes 13. These boxes are supported on a substantially horizontally lined surface formed on an annular shoulder 14 of concrete body 1, as best shown in FIG. 2. A pair of generally vertical outlet tubes 15 extend from each of the boxes 13, with each of the outlet tubes 15 positioned adjacent a radially outer surface of a steel ring 16 that extends substantially within a horizontal plane parallel to the planes A-E, respectively. Steel ring 16 is, in turn, supported by a plurality of separate steel brackets 17 each of which is fastened to a lined portion of shoulder 14. This assembly functions to direct hot air from the respective channels 4, through the collection boxes 13 and into outlet tubes 15, thereby effectively removing the heat from the immediate vicinity of concrete body 1. In addition, a plurality of aligned blow-out openings 18 may be formed in both the metallic ring 3 and concrete body 1 to rapidly release steam from the gap formed between the reactor pressure vessel 2 and the biological shield in the event of a fracture or the like to one of the tubes mounted within the pressure vessel. The particular lining segments positioned on either side of each blow-out opening 18 may be provied with welded sheet metal parts extending in a radial plane in order to attach a frame for each opening 18. In a preferred embodiment, eight blow-out openings 18 may be positioned about the circumference of lining 3.

Four slots 19 are spaced about the upper circumference of metallic lining 3, with each slot being relatively thinner at its vertical upper end portion. In a preferred embodiment, the four slots 19 are spaced substantially 90° from each other about the circumference of lining 3, with a plurality of vertically aligned passageways 20-22 extending through a portion of concrete body 1 aligned with each slot 19. Slots 19 allow for the unobstructed installation of pressure vessel 2 into lining 3, with nozzle assemblies (not shown) extending through passageways 20-22 and aligned slots 19 in order to introduce emergency cooling, feed water and shut-down cooling through the nozzles and into pressure vessel 2 as required. Each of the four sets of vertically aligned passageways 20-22 is attached to a steel plate 23 which is fixedly cast into concrete body 1. Each plate 23 conforms in shape and alignment with a confronting slot 19.

Turning to FIG. 5, a connection assembly is shown for releasably joining confronting lining segments 7 and 8. The connection assembly includes a substantially U-shaped bar member 24 which overlaps a first side portion of each of the confronting lining segments 7 and 8. The connection assembly further includes a plurality of substantially square plates 25, each of which overlaps a second side portion of each of the segments 7 and 8. A plurality of vertically spaced apertures are formed through bar 24, while each plate 25 includes an aperture extending therethrough. By aligning each plate aperture with a respective aperture in bar 24, it is possible to extend a bolt 26 through the aligned apertures. A nut 26' is threadedly mounted on bolt 26 to clamp lining segments 7 and 8 between bar 24 and plates 25. A cap 26" may be initially mounted about each nut 26' to keep concrete away from the threads as concrete body 1 is cast. After casting, bolt 26 is replaced with a thermally-insulated member capable of transmitting tensile forces between bar 24 and the respective plates 25. Alternatively, the original bolt 26 can be retained if it includes an attachment allowing a threaded sleeve to be mounted thereon. Such an assembly is shown in FIG. 6, wherein a connecting link 33 forms an attachment with bolt 26 and includes a threaded sleeve which is also attached to a heat insulated pulling device 29.

By employing attachment connections of the type discussed hereabove, it becomes possible to considerably adjust the position of adjacent lining segments relative to one another. As a result, it becomes possible to manufacture and employ individual lining segments which may vary slight in size, which significantly reduces the overall manufacturing costs.

A thermally insulating material 27 is substantially enclosed in each of a plurality of sheet metal boxes 28, which boxes may take the form of parallelepipeds. Alternatively, boxes 28 may be formed in any convenient, geometric shape, such as a square or rectangle. The sheet metal boxes 28 extend in the tangential direction a distance which is somewhat less than the corresponding width of an individual lining segment, such as segment 7. As a result, a space 30 can be formed between adjacently positioned boxes 28. By selective positioning of the boxes 28, it becomes possible to align a space 30 with each bar 24, as shown in FIG. 6. A stiffening plate 32 encloses space 30 and overlaps adjacent boxes 28, with edge portions of plate 32 extending into substantially cup-shaped recesses formed in each of the adjacent boxes 28. Plate 32 includes an aperture extending therethrough which is substantially aligned with the apertures formed in bar 24 and plate 25. The pulling device 29 extends through the aligned apertures in plate 32, plate 25 and bar 24, and provides a tensile force for clamping lining segments 7 and 8 into fixed positions relative to each other. In addition, pulling device 29 presses plate 32 into contact with boxes 28, clamping boxes 28 into position between plate 32 and metallic lining 3. The space 30 is also filled with thermally insulating material similar to the type positioned within boxes 28. Finally, separate groups of boxes 28 are mounted on top of one another with each of the lowermost boxes being sufficiently strong to support the weight of the remaining boxes 28 mounted thereon.

A plurality of thermally insulating plates 34 extend between concrete body 1 and each of the lining segments, with an edge portion of each plate 34 abutting a cooling channel 4 and an opposite edge portion abutting a U-shaped bar member 24. This arrangement maximizes the thermal insulating ability of the shield assembly while simultaneously insulating the connection assemblies joining adjacent lining segments, such as 7 and 8.

Because the tangential extension of the spaces 30 may vary within relatively large limits, it is possible to manufacture boxes 28 which may vary slightly in size from one another, which significantly reduces their manufacturing cost. In addition, by employing the link connection at 33, it becomes possible to compensate for vertical displacements of pulling device 29 which may result from temperature differences existing between opposite sides of boxes 28. As a result of link 33, pulling device 29 can pivot relative to plate 25 which effectively eliminates the flexural stress in pulling device 29.

Besides the preferred embodiments there are several possible ones. For example, instead of using the boxes 28, heat insulating material in the form of insulating plates or mats may be arranged adjacent to the lining. The plates or mats are then fixed by means of a plurality of clamping means comprising radial fingers projecting from the biological shield and penetrating the plates or mats. The roots of these fingers are fastened to a plurality of frames, which are arranged adjacent to the lining. The frames are fixed to the lining by means of bolts screwed into the nuts 26' after removing the bolts 26.

The present invention is not to be limited to the above-described embodiments, but is to be limited only by the scope of the following claims.

I claim:

1. An improved biological shield assembly for surrounding a nuclear reactor pressure vessel, and comprising:
   an open-ended hollow body of caste concrete-like material of substantially cylindrical configuration, having an inner surface surrounding and spaced from an outer surface of said nuclear reactor pressure vessel to define a gap of appreciable size therebetween;
   a metallic lining assembly positioned in said gap and having an inner surface confronting and spaced from said nuclear reactor pressure vessel;
   a plurality of separate attachment bars each extending from said metallic lining assembly into portions of said caste concrete-like material to fixedly attach said metallic lining assembly to said hollow body;
   thermal insulating means surrounding and permanently spaced an appreciable distance from said pressure vessel for thermally insulating said hollow body from heat radiating radially outwardly from said nuclear reactor pressure vessel;
   a plurality of separate blow-out openings each extending through said hollow body of concrete-like material and joining said gap with surrounding ambient atmosphere for rapidly dissipating steam or the like released into said gap from said nuclear reactor pressure vessel;
   a plurality of dip-galvanized metallic cooling passageway means each positioned adjacent the inner surface of said hollow body and welded to an outer surface of said metallic lining assembly for conveying heat away from said hollow body;
   each of said passageway means comprising substantially vertically extending first and second sections each extending from said lining assembly toward said hollow body and a third section joining said first and second sections to form a closed passageway with said metallic lining assembly for conveying heat away from said hollow body and metallic lining assembly.

2. A biological shield according to claim 1, wherein said first, second and third sections of each of said metallic passageway means define a unitary, substantially channel configuration having a pair of opposite end surfaces welded into attachment with said metallic lining assembly.

3. A biological shield according to claim 2, wherein said first and second sections each extend into a recess formed in the inner surface of said hollow body, and said third section extends adjacent a bottom portion of said recess.

4. A biological shield according to claim 1, wherein each of said dip-galvanized metallic cooling passageway means includes first and second sections extending into a separate recess formed in the inner surface of said hollow wall, with each of said third sections extending adjacent a bottom portion of one of said recesses.

5. A biological shield according to claim 1, wherein each of said plurality of separate attachment bars includes a first end portion fixedly attached to one of said first and second channel sections, respectively, and each of said attachment bars further includes a second, opposite end portion embedded in said hollow body, fixedly attaching said channel sections and said lining assembly to said hollow body of concrete-like material.

6. A biological shield according to claim 1, wherein said thermal insulating means comprises a plurality of box-like metallic containers each positioned adjacent a side of said metallic lining assembly confronting said pressure vessel, with each of said containers enclosing a quantity of thermally insulating material.

7. A biological shield according to claim 6, wherein each of said box-like containers forms a substantially parallelepiped configuration, with a plurality of said containers stacked one on top of the other.

8. A biological shield according to claim 6, wherein adjacent containers located in similar horizontal planes are spaced from one another to form an intermediate space therebetween, with a separate covering plate overlapping each pair of horizontally adjacent containers, wherein each of said covering plates includes a plurality of vertically aligned apertures extending therethrough.

9. A biological shield according to claim 8, wherein a quantity of thermally insulating material is positioned within each intermediate space formed between said horizontally adjacent containers, said covering plate and a portion of said lining assembly, and a plurality of separately adjustable connecting assemblies extend through each of said intermediate spaces, with an end portion of each connecting assembly extending through one of said apertures formed through said covering plate and respective opposite end portion of each connecting assembly releasably attached to a portion of said lining assembly is horizontally aligned with said aperture extending through said covering plate, with said connecting assemblies being selectively adjustable to bring said overlapping plate and said lining assembly into clamping contact with said adjacently disposed containers.

10. A biological shield according to claim 9, wherein each of said connecting assemblies is pivotally attached to said lining assembly, allowing movement of said adjacently disposed containers relative to said lining in response to thermal stresses and the like.

11. An improved biological shield assembly for surrounding a nuclear reactor pressure vessel, and comprising:

an open-ended hollow body of caste concrete-like material having an open-ended, substantially cylindrical configuration with an inner surface surrounding and spaced from an outer surface of said nuclear reactor pressure vessel, defining a gap of appreciable size therebetween;

a metallic lining assembly positioned in said gap, and a plurality of separate attachment bars each extending from said metallic lining assembly into portions of said caste concrete-like material to fixedly attach said metallic lining assembly to said hollow body;

said metallic lining assembly including a plurality of substantially ring-shaped sections stacked one on top of the other, each ring-shaped section comprising a plurality of separate metallic lining segments dip-galvanized and positioned side-by-side;

dip-galvanized metallic cooling passageway means positioned adjacent the inner surface of said hollow body and welded to said metallic lining assembly for conveying heat away from said hollow body; and separate clamping means positioned between each pair of lining segments positioned side-by-side for connecting each pair of lining segments to one another while allowing for misalignment between adjacent lining segments due to manufacturing tolerances as well as thermal expansion and contraction of said lining segments relative to one another.

12. A biological shield according to claim 11, wherein each of said clamping means comprises a substantially U-shaped bar overlapping first side portions of a pair of lining segments disposed side-by-side, said clamping means further comprising at least one plate overlapping second side portions of said pair of lining segments, and said clamping means further comprising an adjustable fastening assembly extending between said U-shaped bar and said plate for drawing said plate and bar into clamping attachment with said pair of lining segments.

13. A biological shield according to claim 11, wherein each of said lining segments extends less than one-tenth the total circumference of said respective ring-shaped section formed by said plurality of attached lining segments.

14. A biological shield according to claim 11, wherein each of said lining segments includes an attachment member mounted on a horizontally extending end portion thereof, with a fastening assembly joining the attachment member of a specific lining segment with a separate lining segment vertically aligned therewith.

* * * * *